United States Patent Office.

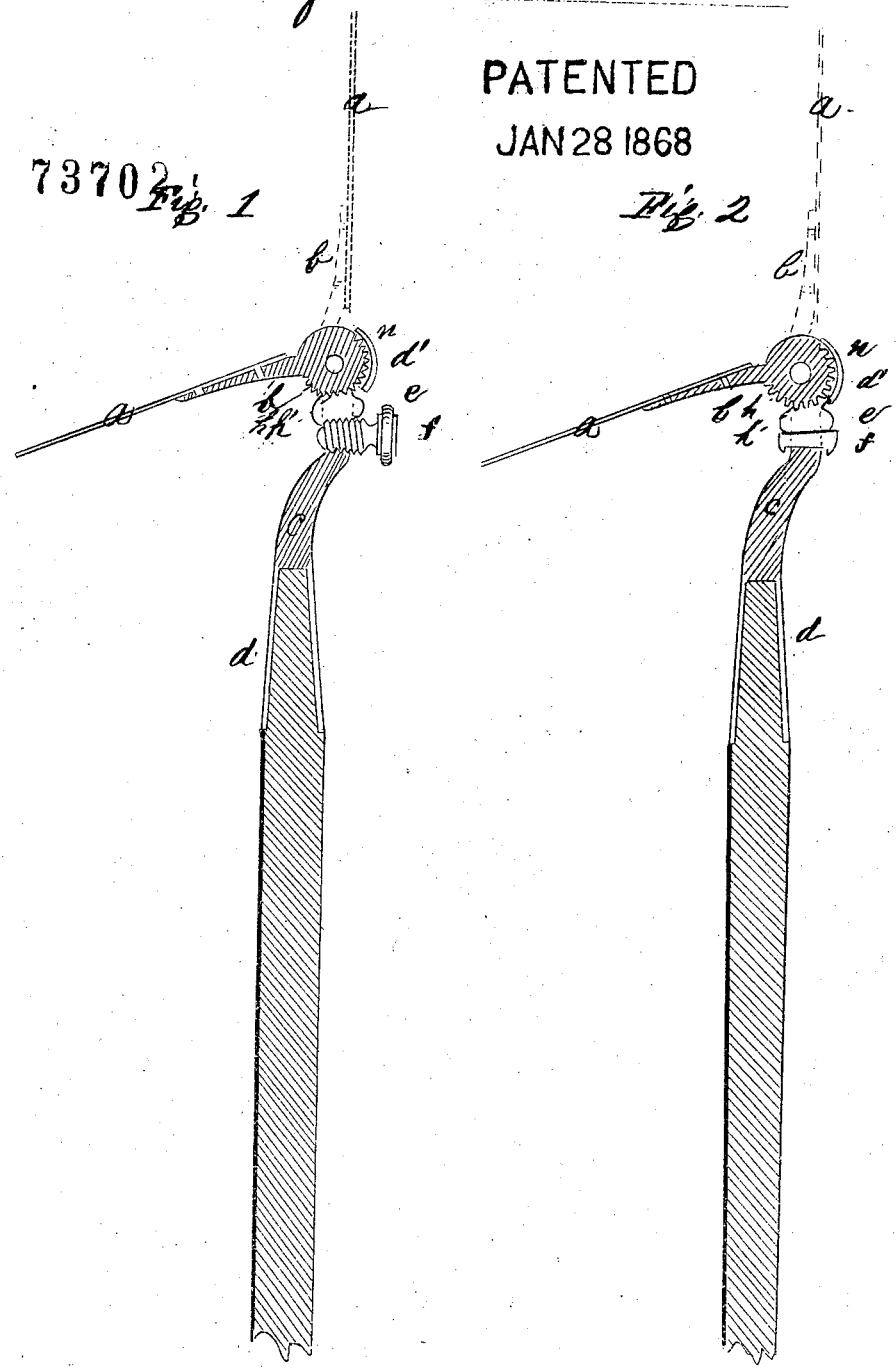

TIMOTHY DRAKE, OF HARTFORD, CONNECTICUT.

*Letters Patent No. 73,702, dated January 28, 1868.*

IMPROVEMENT IN ADJUSTABLE HOE.

*The Schedule referred to in these Letters Patent and making part of the same.*

TO ALL WHOM IT MAY CONCERN:

Be it known that I, TIMOTHY DRAKE, of Hartford, county of Hartford, and State of Connecticut, have invented certain new and useful Improvements in Adjustable Hoes, &c.; and to enable others skilled in the art to make and use the same, I will proceed to describe its construction and operation by referring to the drawings, in which the same letters indicate like parts in each of the figures.

The nature of this improvement will be understood from the specification and drawings.

The object desired to be attained thereby is to cheapen the manufacture and produce a more convenient and useful article of trade and use. In the accompanying drawings—

Figures 1 and 2 are side sectional views, showing the different forms of fastening, and how the blade may be adjusted, and how it may be used for various purposes.

$a$ is the blade. $b$ is a shank to which the blade is secured. $c$ is a handle-shank, having a socket, $d$, into which the handle is fitted in the ordinary way. $d'$ is a head or joint, into which the blade-shank $b$ is fitted. This head is also provided with an orifice or slit, into which is fitted a gib, $e$, and is held in place by means of a key or screw, $b$. The gib $e$, which is fitted into the slot, is also provided with depressions, so that when its surface is pressed up against the edge of the said shank $b$, its depressions will closely fit into the depressions $h$, on the circumference or edge of the shank $b$. This gib is also provided with projections $h'$, which prevent it from moving vertically in its slot. This gib $b$ is pressed up to the shank, and thus holds the blade firmly in the desired position.

Thus this implement may be used for a hoe, spade, or pruning-knife, and its position easily and quickly changed when desirable.

The upper edge of the shank $d'$ is provided with a head or cap, $n$, which protects it from dirt, and also for a bat, to break lumps of dirt, or to loosen the moist dirt from the hoe-blade.

I believe I have thus shown the nature, construction, and advantage of this improvement, so as to enable others skilled in the art to make and use the same therefrom.

I do not claim the device as shown in the patent of S. W. Adams, October 23, 1866; but

What I claim, and desire to secure, is—

The mode of construction and arrangement of the blade $a$, shank $b$, shank and head $c$ $d'$, gib $e$, fastening-screw $f$, substantially as described.

TIMOTHY DRAKE. [L. S.]

Witnesses:
  E. W. BLISS,
  JEREMY W. BLISS.